(12) United States Patent
Kashou et al.

(10) Patent No.: US 9,674,312 B2
(45) Date of Patent: Jun. 6, 2017

(54) DYNAMIC PROTOCOL SELECTION

(71) Applicant: NetApp Inc., Sunnyvale, CA (US)

(72) Inventors: David Kashou, Martinez, CA (US); Radek Aster, Campbell, CA (US)

(73) Assignee: NetApp, Inc., Sunnyvale, CA (US)

( * ) Notice: Subject to any disclaimer, the term of this patent is extended or adjusted under 35 U.S.C. 154(b) by 529 days.

(21) Appl. No.: 13/930,709

(22) Filed: Jun. 28, 2013

(65) Prior Publication Data
US 2015/0006748 A1 Jan. 1, 2015

(51) Int. Cl.
G06F 15/16 (2006.01)
H04L 29/06 (2006.01)

(52) U.S. Cl.
CPC .................... *H04L 69/08* (2013.01)

(58) Field of Classification Search
CPC ... H04L 67/1097; H04L 49/15; H04L 49/357; H04L 69/08; G06F 3/0689
USPC .......................................................... 709/230
See application file for complete search history.

(56) References Cited

U.S. PATENT DOCUMENTS

| | | | | |
|---|---|---|---|---|
| 8,489,023 B1* | 7/2013 | Gao | ...................... | H04W 72/02 455/41.2 |
| 8,943,233 B1* | 1/2015 | Mark | ...................... | G06F 13/10 710/10 |
| 2005/0138154 A1* | 6/2005 | Seto | ........................ | H04L 29/06 709/223 |
| 2006/0282545 A1* | 12/2006 | Arwe | ...................... | H04L 69/24 709/237 |
| 2007/0220204 A1* | 9/2007 | Nakajima | ............. | G06F 3/0607 711/114 |
| 2008/0183917 A1* | 7/2008 | Cagno | .................. | G06F 13/4265 710/33 |
| 2009/0180382 A1* | 7/2009 | Klein | .................... | H04L 5/1446 370/235 |
| 2009/0245274 A1* | 10/2009 | Hurwitz | .................. | H04L 12/44 370/445 |
| 2011/0110229 A1* | 5/2011 | Himayat | .................. | H04L 47/41 370/230 |
| 2012/0233399 A1* | 9/2012 | Kurokawa | ........... | H04L 12/4625 711/114 |

* cited by examiner

Primary Examiner — Melvin H Pollack
(74) Attorney, Agent, or Firm — LeClairRyan, a Professional Corporation

(57) ABSTRACT

Dynamic selection of a protocol for communication between devices is disclosed. A first device may be connected to a second device by one or more communication links, such as a first communication link and a second communication link. Because the first device and the second device may not have pre-existing knowledge of what protocols are supported by the other device, the first device and the second device may perform protocol discovery by attempting protocols on the communication links in a coordinated manner. In this way, if a communication link becomes active between the first device and the second device, then a protocol attempted on the communication link may be supported by the first device and the second device, and thus may be used across the communication links. If multiple protocols are supported, then a preferred protocol is used across the communication links.

12 Claims, 11 Drawing Sheets

DYNAMIC PROTOCOL SELECTION

BACKGROUND

Devices may communicate with one another utilizing various protocols. In an example, a storage controller may communicate with a storage device using a SAS protocol (e.g., the storage controller may utilize a standardized SAS 2.0 protocol over a cooper cable). In another example, a storage switch may communicate with a storage device using a modified version of the SAS protocol (e.g., the storage switch may utilize a vendor specific non-standardized link initialization protocol over an optical cable because the standard SAS 2.0 protocol does not natively support optical cables). In another example, a first device (e.g., a USB storage device, a mobile phone, a peripheral, and/or other devices) may connect to a second device utilizing other types of protocols, such as a USB protocol, a wire protocol, or a wireless protocol. Some protocols may be compatible with other protocols (e.g., a standardized SAS 3.0 protocol may be compatible with the standardized SAS 2.0 protocol), while other protocols may not be compatible (e.g., the standardized SAS 3.0 protocol may not be compatible with the vendor specific non-standardized link initialization protocol).

DETAILED DESCRIPTION

Figure 1:
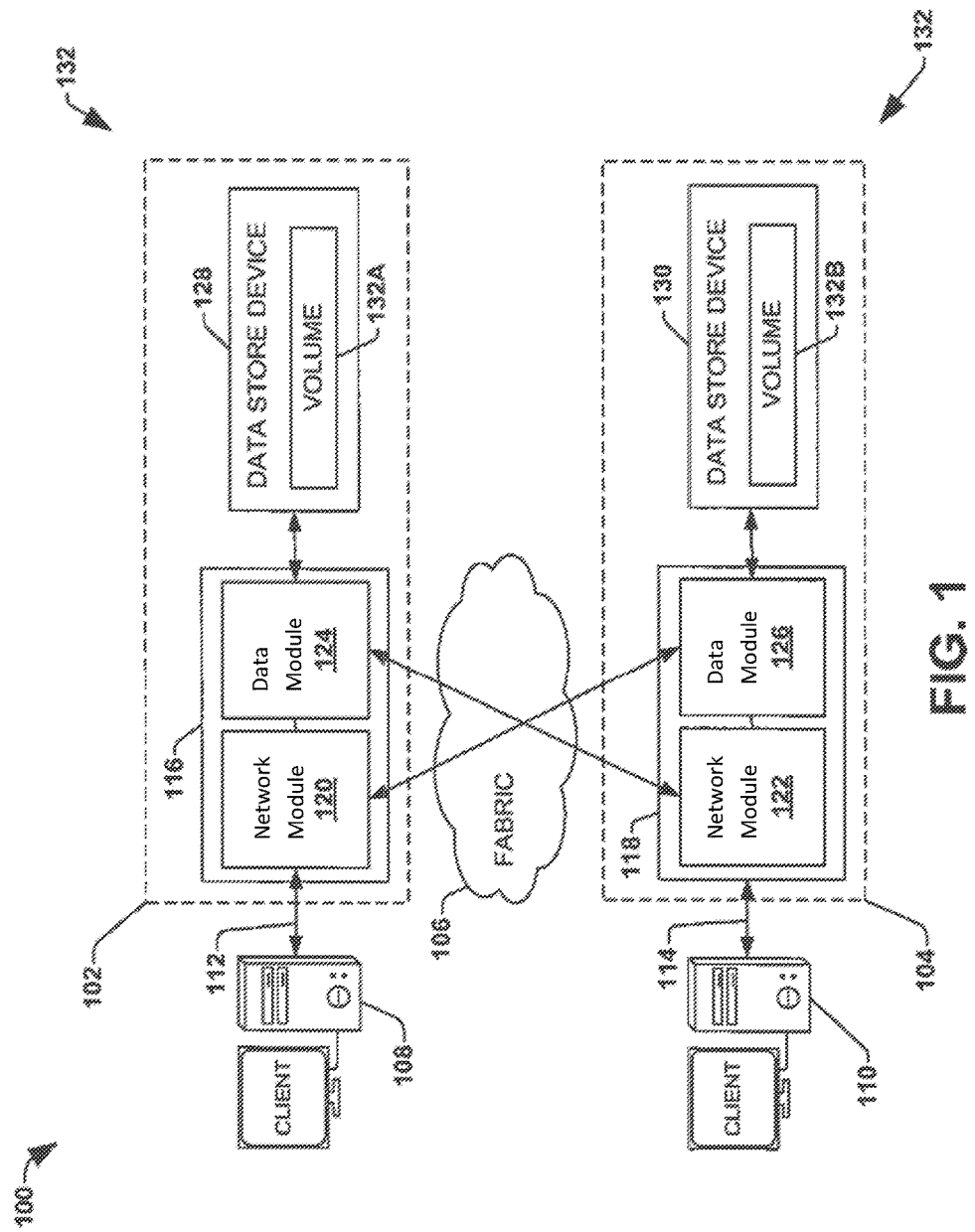
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A first device and a second device may attempt to establish a communication connected between one another. However, the first device and the second device may not have pre-existing knowledge of what protocols are supported and/or preferred by the other device. If the first device and the second device utilize a switching algorithm that attempts different protocols by switching between such protocols at switching intervals until a communication link is active, then inconsistent results may occur and/or non-preferred protocols may be utilized because the switching algorithm may assume that the same protocol is active at the same time on all communication links (e.g., a non-preferred protocol that is relatively slower or less secure than other available and supported protocols may be used because the non-preferred protocol is the first protocol that establishes an active communication link).

Accordingly, a protocol discovery and synchronization technique for dynamic selection of a protocol for communication between devices is provided herein. It may be appreciated that a protocol may correspond to a wide variety of protocols, such as a standardized protocol (e.g., a USB protocol, a wireless protocol, a Bluetooth protocol, an HDMI protocol, a video protocol, an audio protocol, a wire protocol, a SAS 2.0 protocol, a SAS 3.0 protocol, and/or any other protocol that may facilitate communication between devices) or a non-standardized protocol (e.g., a vendor specific non-standardized link initialization protocol). It may be appreciated that the protocol discovery and synchronization technique may be utilized for any types of devices (e.g., a laptop connecting to a monitor, a video game console connecting to a tablet device, a storage controller connecting to a storage device, a storage switch connecting to a storage device, a mobile multimedia device connecting to an audio device, etc.).

To provide context for dynamically selecting a protocol for communication between devices, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 to connect with clients 108, 110 over the network connections 112, 114, for example, allowing clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprising a differing number of these modules. For example, there may be a plurality of network and/or data modules interconnected in a cluster that does not have a one-to-one correspondence between the network and data modules. That is, different nodes can have a different number of network and data modules, and the same node can have a different number of network modules than data modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the network module 120 in the node 116 within data storage system 102. The node 116 can forward the data to the data storage device 128 using the data module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that in one example, one or more communication components for dynamically selecting a protocol for communication between devices may be implemented within the clustered network environment 100. For example, a first communication component may be hosted by client 108 and a second communication component may be hosted by client 110. The first communication component and the second communication component may facilitate protocol discovery and/or synchronization for communication between the client 108 and the client 110.

Figure 2:
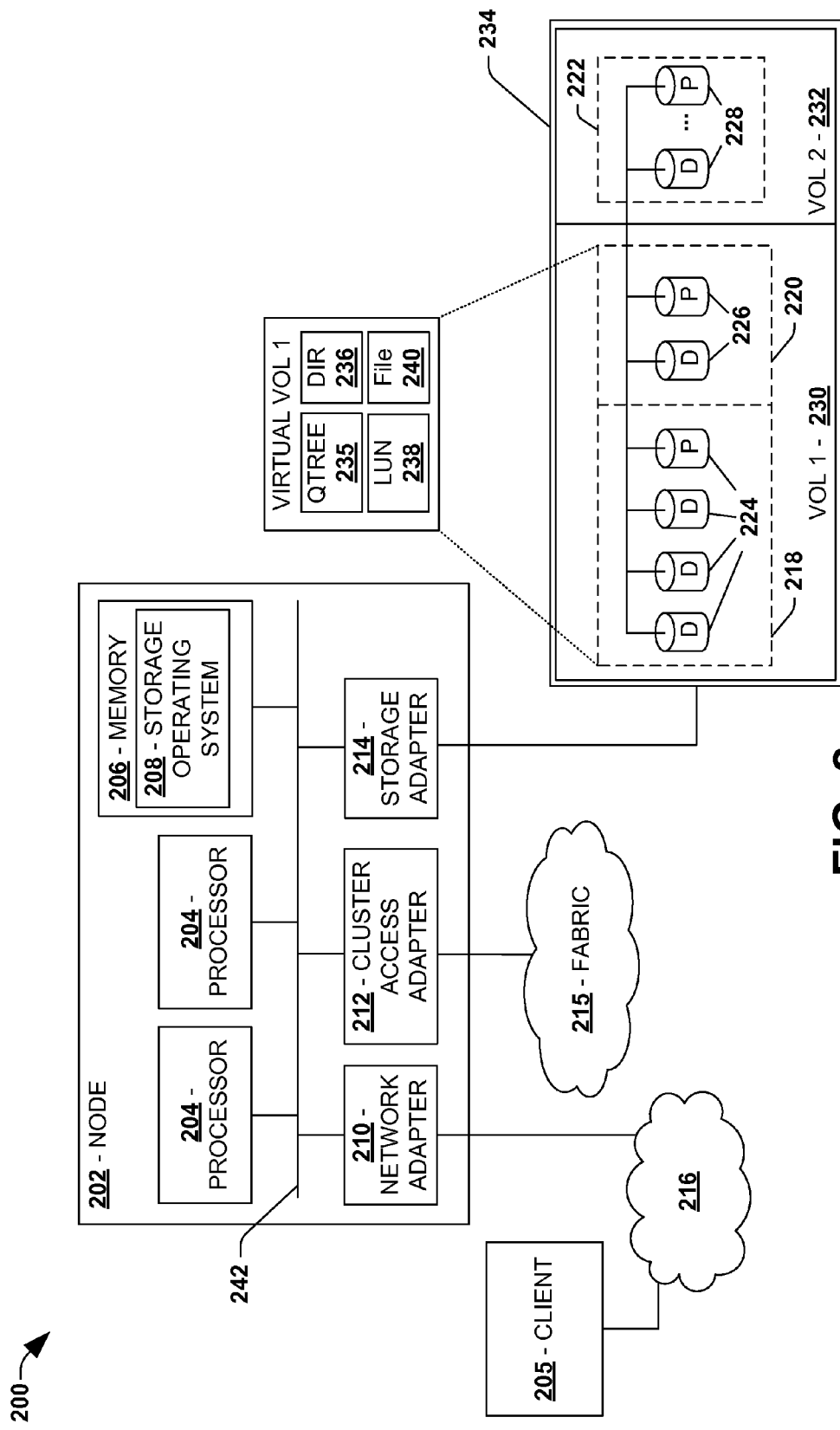
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can respond to client requests to manage data on the data storage device 234 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that in one example, one or more communication components for dynamically selecting a protocol for communication between devices may be implemented within network 216 or any other type of network (e.g., a home network, a corporate network, a first device connected to second device using a cable or a wireless connection, etc.). For example, a first communication component may be hosted by client 205, and a second communication component may be hosted by the node 202. The first communication component and the second communication component may facilitate protocol discovery and/or synchronization for communication between the client 205 and the node 202.

Figure 3:
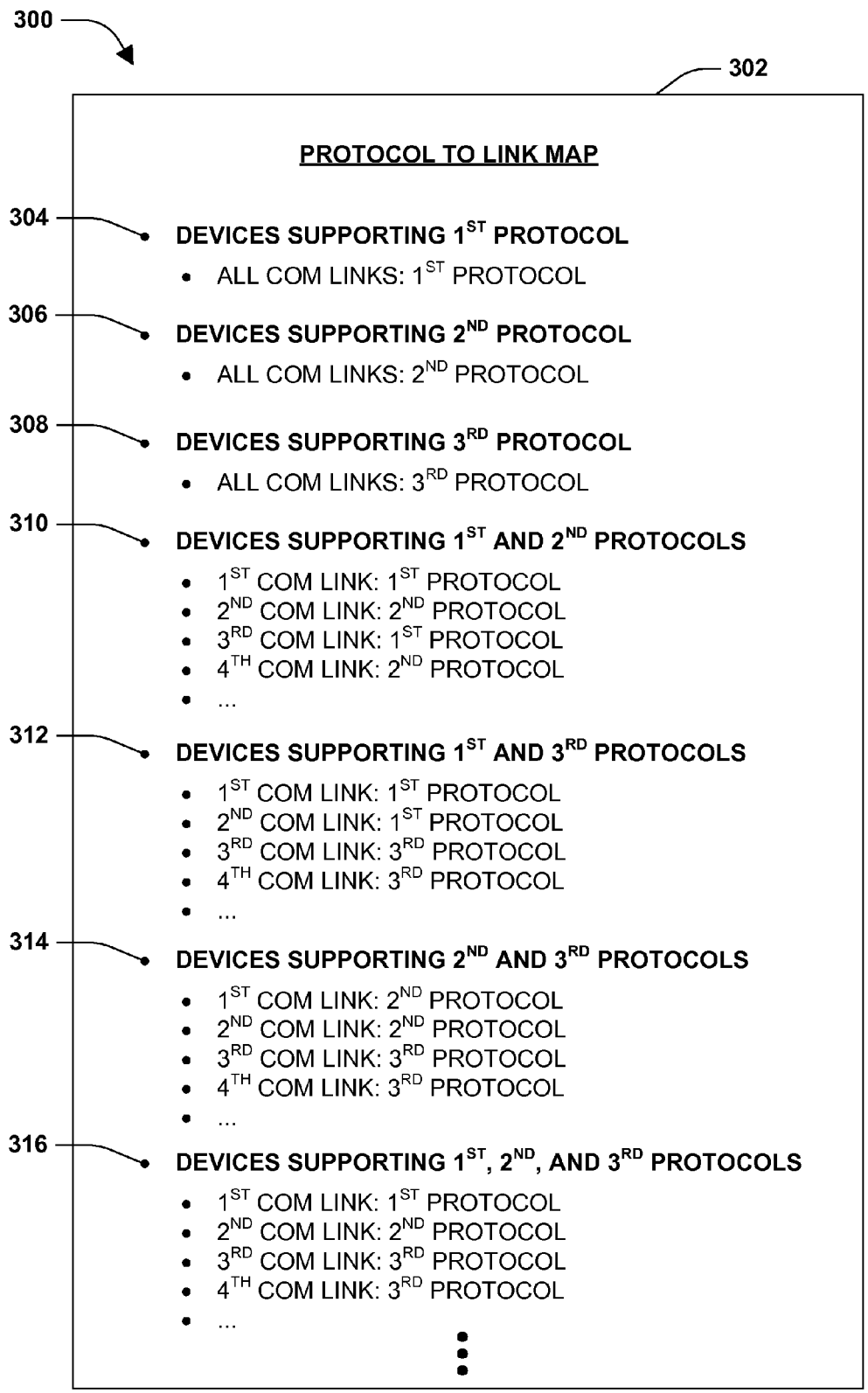
FIG. 3 is an illustration of an example of a protocol to link map.

FIG. 3 illustrates an example 300 of a protocol to link map 302. The protocol to link map 302 may specify one or more mappings of protocols (e.g., a communication protocol, such as a SAS protocol, a wire protocol, a wireless protocol, etc.) to communication links (e.g., a path over which devices may communicate). The protocol to link map 302 may be used by devices during protocol discovery in order to determine what protocols to attempt over which communication links. That is, devices may utilize the protocol to link map 302 so that such devices attempt protocols over similar communication links (e.g., if a first device attempts a first protocol on a first communication link and a second protocol over a second communication link, while a second device attempts the second protocol over the first communication link and the first protocol over the second communication link, then neither device would establish an active communication link even though both devices support the first protocol and the second protocol). It may be appreciated that the protocol to link map 302 is merely a simplified example of how devices may coordinate protocol discovery by attempting similar protocols over communication links, and that a variety of other mappings, rules, and/or techniques are contemplated herein.

In an example of utilizing the protocol to link map 302, a first mapping 304 may specify that a device supporting merely a first protocol is to attempt the first protocol over all communication links. A second mapping 306 may specify that a device supporting merely a second protocol is to attempt the second protocol over all communication links. A third mapping 308 may specify that a device supporting merely a third protocol is to attempt the third protocol over all communication links. A fourth mapping 310 may specify that a device supporting merely the first protocol and the second protocol is to attempt the first protocol on a first communication link and a third communication link (e.g., other mappings may specify that the first protocol is to be attempted on the first communication link and/or the third communication link so that devices supporting the first protocol may establish an active communication link using the first protocol), and that the second protocol is to be attempted on a second communication link and a fourth communication link (e.g., other mappings may specify that the second protocol is to be attempted on the second communication link and/or the fourth communication link so that devices supporting the second protocol may establish an active communication link using the second protocol).

A fifth mapping 312 may specify that a device supporting merely the first protocol and the third protocol is to attempt the first protocol on the first communication link and the second communication link (e.g., other mappings may specify that the first protocol is to be attempted on the first communication link and/or the second communication link so that devices supporting the first protocol may establish an active communication link using the first protocol), and that the third protocol is to be attempted on the third communication link and the fourth communication link (e.g., other mappings may specify that the third protocol is to be attempted on the third communication link and/or the fourth communication link so that devices supporting the third protocol may establish an active communication link using the third protocol).

A sixth mapping 314 may specify that a device supporting merely the second protocol and the third protocol is to attempt the second protocol on the first communication link and the second communication link (e.g., other mappings may specify that the second protocol is to be attempted on the first communication link and/or the second communication link so that devices supporting the second protocol may establish an active communication link using the second protocol), and that the third protocol is to be attempted on the third communication link and the fourth communication link (e.g., other mappings may specify that the third protocol is to be attempted on the third communication link and/or the fourth communication link so that devices supporting the third protocol may establish an active communication link using the third protocol).

A seventh mapping 316 may specify that a device supporting merely the first protocol, the second protocol, and the third protocol is to attempt the first protocol on the first communication link (e.g., other mappings may specify that the first protocol is to be attempted on the first communication link so that devices supporting the first protocol may establish an active communication link using the first protocol), that the second protocol is to be attempted on the second communication link (e.g., other mappings may specify that the second protocol is to be attempted on the second communication link so that devices supporting the second protocol may establish an active communication link using the second protocol), and that the third protocol is to be attempted on the third communication link and the fourth communication link (e.g., other mappings may specify that the third protocol is to be attempted on the third communication link and/or the fourth communication link so that devices supporting the third protocol may establish an active communication link using the third protocol). In this way, devices may utilize the protocol to link map 302 to synchronize which protocols to attempt over which communication links when discovering what protocols are supported by other devices.

Figure 4:
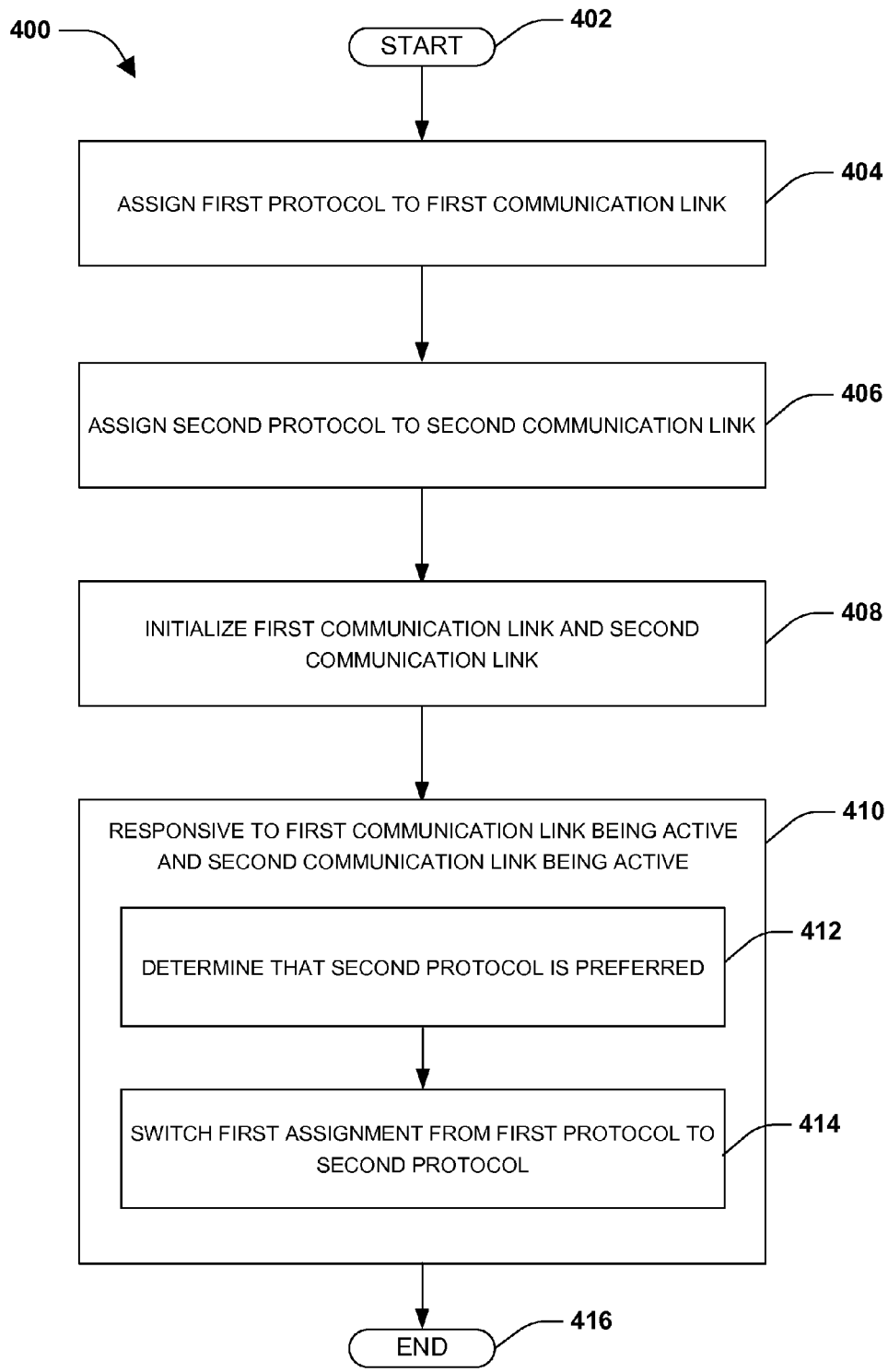
FIG. 4 is a flow chart illustrating an exemplary method of dynamically selecting a protocol for communication between devices.

One embodiment of dynamically selecting a protocol for communication between devices is illustrated by an exemplary method 400 of FIG. 4. At 402, the method starts. A first device and a second device may attempt to establish communication between one another over one or more communication links (e.g., a communication channel, a data path, etc.). For example, a storage controller or switch may attempt to communicate with a storage device across a wireless communication channel or a wired communication channel (e.g., an optical cable connected to wide ports of the first device and the second device, where the wide ports comprise one or more communication links). The first device and the second device may not have pre-existing knowledge of what protocols are supported by the other device, and thus a protocol discovery and synchronization technique may be implemented for dynamically selecting a protocol for communication between devices. For example, a first protocol, a second protocol, and/or other protocols may be attempted across communication links between the first device and the second device in order to determine which communication links are active, and thus indicating which protocols are supported. In an example, the first protocol comprises a non-standardized protocol (e.g., a vendor specific non-standardized link initialization protocol that supports optical cables otherwise not supported by a standardized SAS 2.0 protocol), and the second protocol comprises a standardized protocol (e.g., a standardized SAS 3.0 protocol). In another example, the first protocol and the second protocol are not compatible (e.g., the standardized SAS 3.0 protocol may not be compatible with the vendor specific non-standardized link initialization protocol).

At 404, the first protocol is assigned to a first communication link between the first device and the second device as a first assignment (e.g., by a device, such as the second device, that supports the first protocol). For example, the first assignment may be performed based upon the protocol to link map 302 of FIG. 3 (e.g., the first protocol may be assigned to one or more additional communication links specified by the protocol to link map 302). At 406, the second protocol is assigned to a second communication link between the first device and the second device as a second assignment (e.g., by a device, such as the second device, that supports the second protocol). For example, the second assignment may be performed based upon the protocol to link map 302 of FIG. 3 (e.g., the second protocol may be assigned to one or more additional communication links specified by the protocol to link map 302). In an example, one or more additional protocols, such as a third protocol, may be assigned to one or more additional communication links based upon whether the first device and/or the second device support such protocols (e.g., the second device may assign the third protocol to a third communication link as a third assignment based upon the second device supporting the third protocol).

Figure 6A:
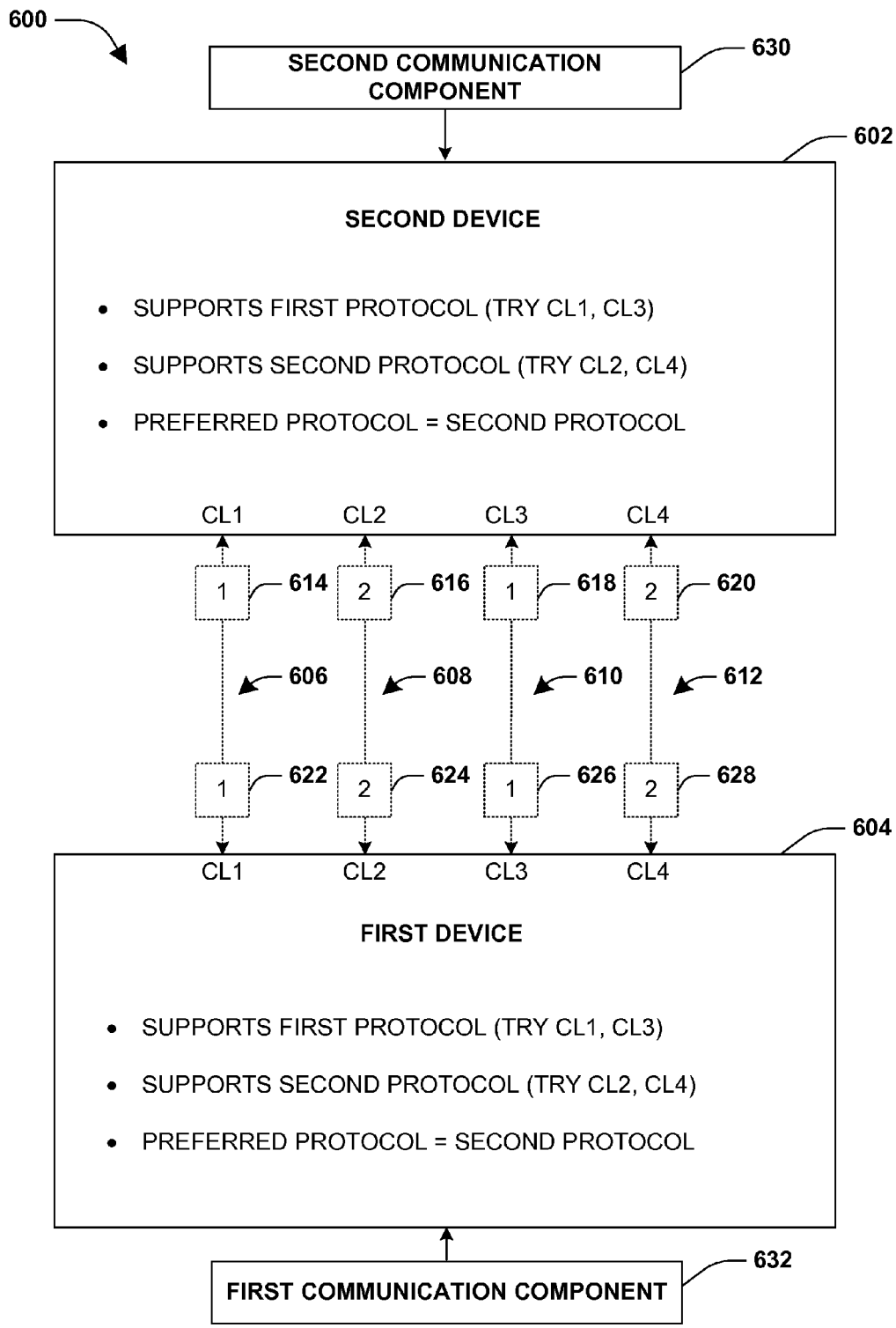
FIG. 6A is a component block diagram illustrating an exemplary system for dynamically selecting a protocol, preferred over another supported protocol, for communication between devices.
Figure 7A:
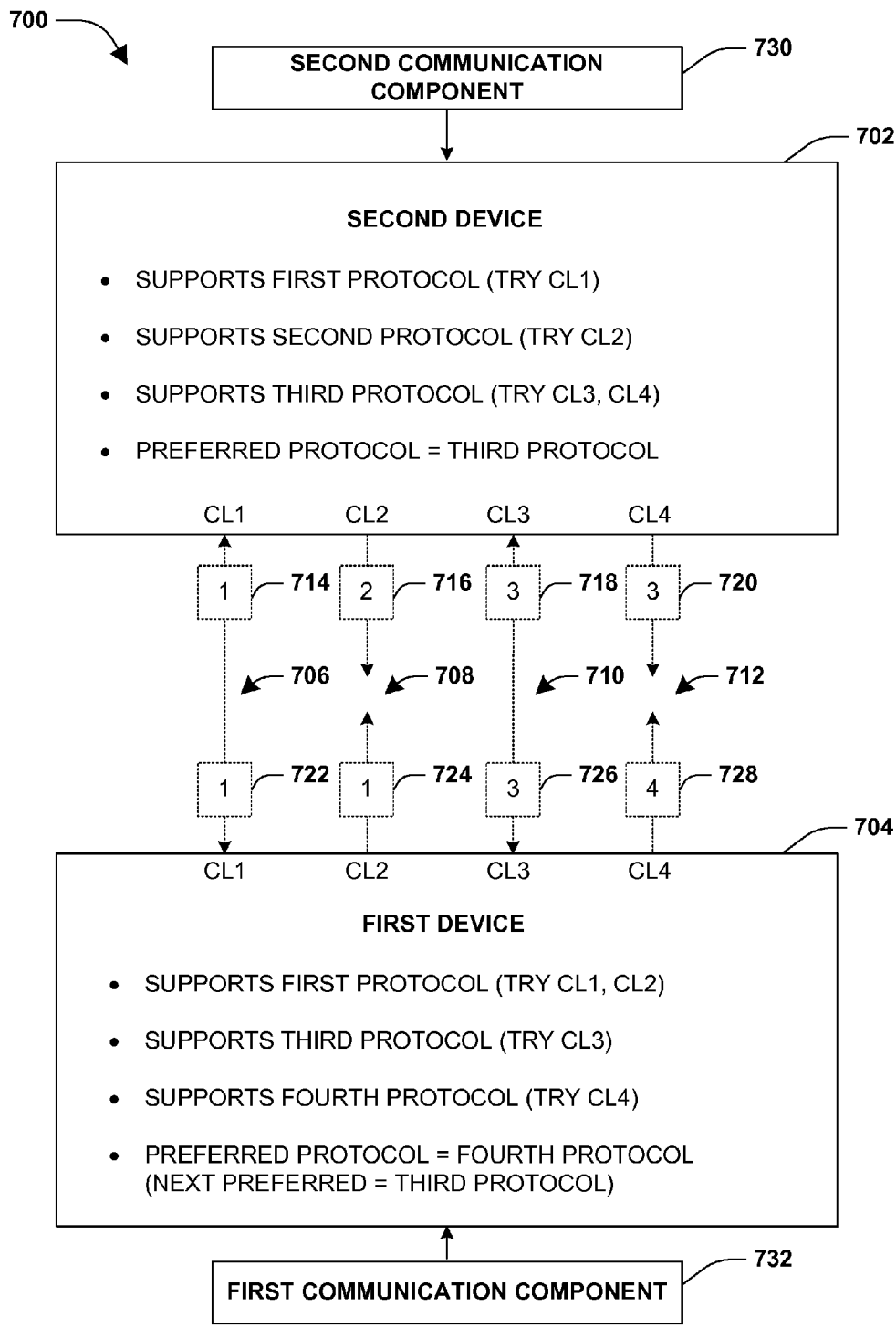
FIG. 7A is a component block diagram illustrating an exemplary system for dynamically selecting a protocol, preferred over another supported protocol, for communication between devices.

At 408, the first communication link, the second communication link, and/or other communication links may be initialized. For example, the second device may attempt to establish communication (e.g., utilizing an out of band signal during a link initialization sequence) with the first device across the communication links. Similarly, the first device may assign one or more protocols to the communication links (e.g., based upon protocols supported by the first device and/or based upon the protocol to link map 302 of FIG. 3), and may attempt to initialize such communication links for communication with the second device. If a communication link becomes active, then the protocol attempted over the communication link may be determined as supported by the devices, otherwise, the device that attempted the protocol over the communication link (e.g., the second device) may determine that the other device (e.g., the first device) does not support the protocol. It may be appreciated that FIGS. 5A, 6A, and 7A illustrate various examples of protocol discovery by devices.

At 410, responsive to the first communication link being active and the second communication link being active (e.g., FIG. 6A), a determination may be made that the first protocol, attempted over the first communication link by the second device, and the second protocol, attempted over the second communication link by the second device, are supported by the first device and the second device. At 412, the second protocol may be determined as being preferred over the first protocol (e.g., the second protocol may have a faster data speed or may provide for more secure communication than the first protocol). Accordingly, the first assignment for the first communication link may be switched from the first protocol to the second protocol, at 414 (e.g., FIG. 6B). In this way, the second device may discover what protocols are supported by the first device in a coordinated manner (e.g., utilizing the protocol to link map 302 so that the first device and the second device attempt protocols over similar communication links), and a preferred protocol may be used for communication between the first device and the second device (e.g., across all communication links).

Figure 5A:
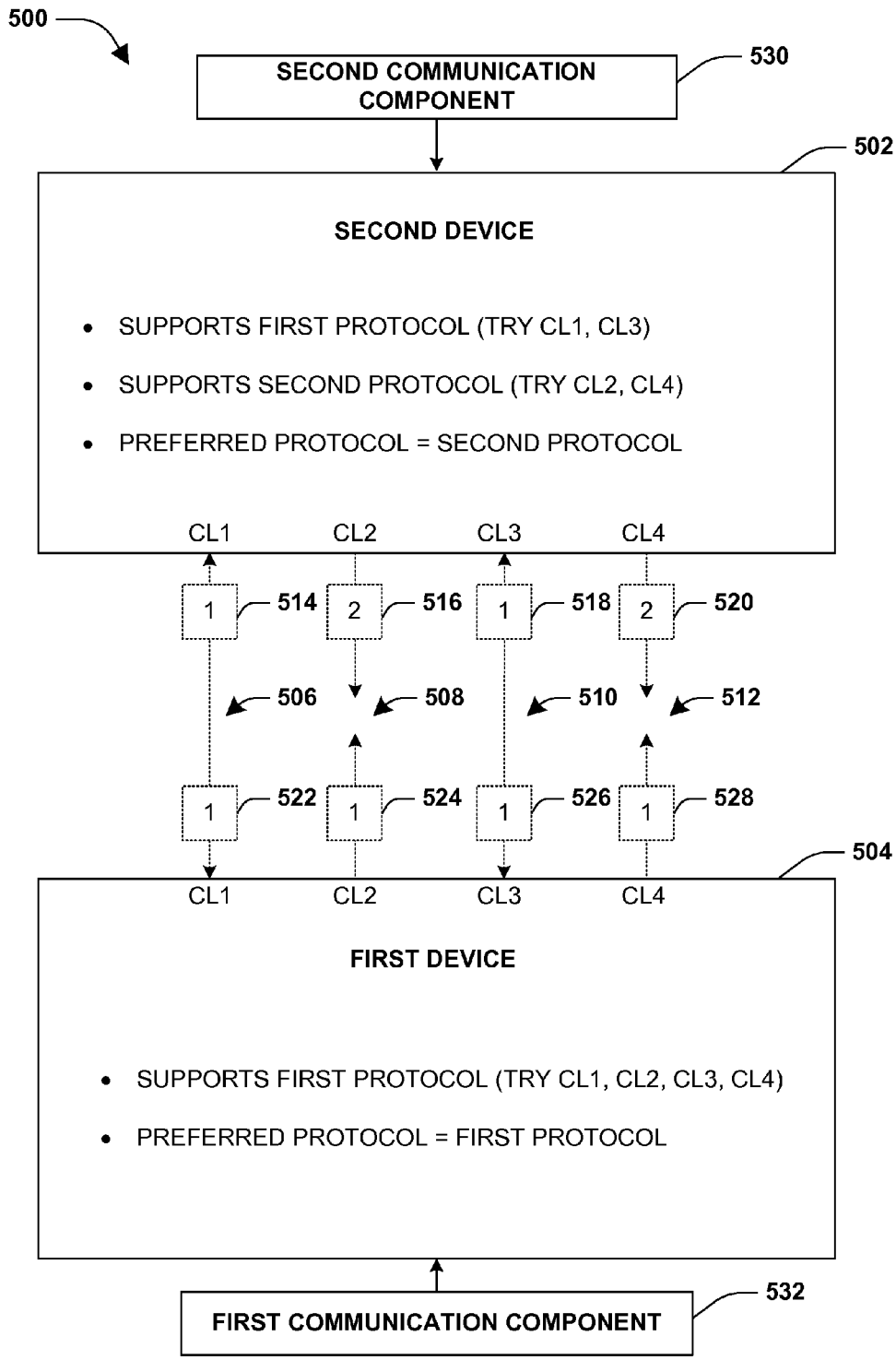
FIG. 5A is a component block diagram illustrating an exemplary system for dynamically selecting a protocol for communication between devices.

In an example, responsive to the first communication link being active and the second communication link being inactive, a determination may be made that the first protocol, attempted over the first communication link by the second device, but not the second protocol, attempted over the second communication link by the second device, is supported by the first device (e.g., FIG. 5A). Accordingly, the second assignment for the second communication link may be switched from the second protocol to the first protocol because the first device supports the first protocol and does not support the second protocol (e.g., FIG. 5B). In this way, devices may discover and/or synchronize protocols for dynamic selection of a protocol for communication between such devices. At 416, the method ends.

FIG. 5A illustrates an example of a system 500 for dynamically selecting a protocol for communication between devices. The system 500 may comprise a first communication component 532 associated with a first device 504 and/or a second communication component 530 associated with a second device 502. The first communication component 532 and/or the second communication component 530 may be configured to attempt one or more protocols over communication links between the first device 504 and the second device 502. For example, a first communication link 506, a second communication link 508, a third communication link 510, a fourth communication link 512, and/or other communication links not illustrated may connect the first device 504 and the second device 502 (e.g., the communication links may be associated with links along an optical cable between wide ports of the first device 504 and the second device 502).

The first device 504 may support a first protocol, and the first protocol may be a preferred protocol for the first device 504. Accordingly, the first communication component 532 may assign the first protocol to the first communication link 506 as a first assignment 522, to the second communication link 508 as a second assignment 524, to the third communication link 510 as a third assignment 526, and to the fourth communication link 512 as a fourth assignment 528 (e.g., based upon the protocol to link map 302). The second device 502 may support the first protocol and a second protocol. The second protocol may be a preferred protocol for the second device 502. Accordingly, the second communication component 530 may assign the first protocol to the first communication link 506 as a fifth assignment 514 and to the third communication link 510 as a sixth assignment 518 (e.g., based upon the protocol to link map 302). The second communication component 530 may assign the second protocol to the second communication link 508 as a seventh assignment 516 and to the fourth communication link 512 as an eighth assignment 520 (e.g., based upon the protocol to link map 302).

The first communication component 532 may initialize the communication links utilizing the assigned protocols for the first device 504, and the second communication component 530 may initialize the communication links utilizing the assigned protocols for the second device 502. In an example, the second communication component 530 may determine that the first communication link 506, using the first protocol, and the third communication link 510, using the first protocol, may be active, and thus the second communication component 530 may determine that the first device 504 supports the first protocol. The second communication component 530 may determine that the second communication link 508, using the second protocol, and the fourth communication link 512, using the second protocol, may be inactive, and thus the second communication component 530 may determine that the first device 504 does not support the second protocol. In this way, the second device 502 and the first device 504 may communicate over the communication links utilizing the first protocol, as illustrated in FIG. 5B.

Figure 5B:
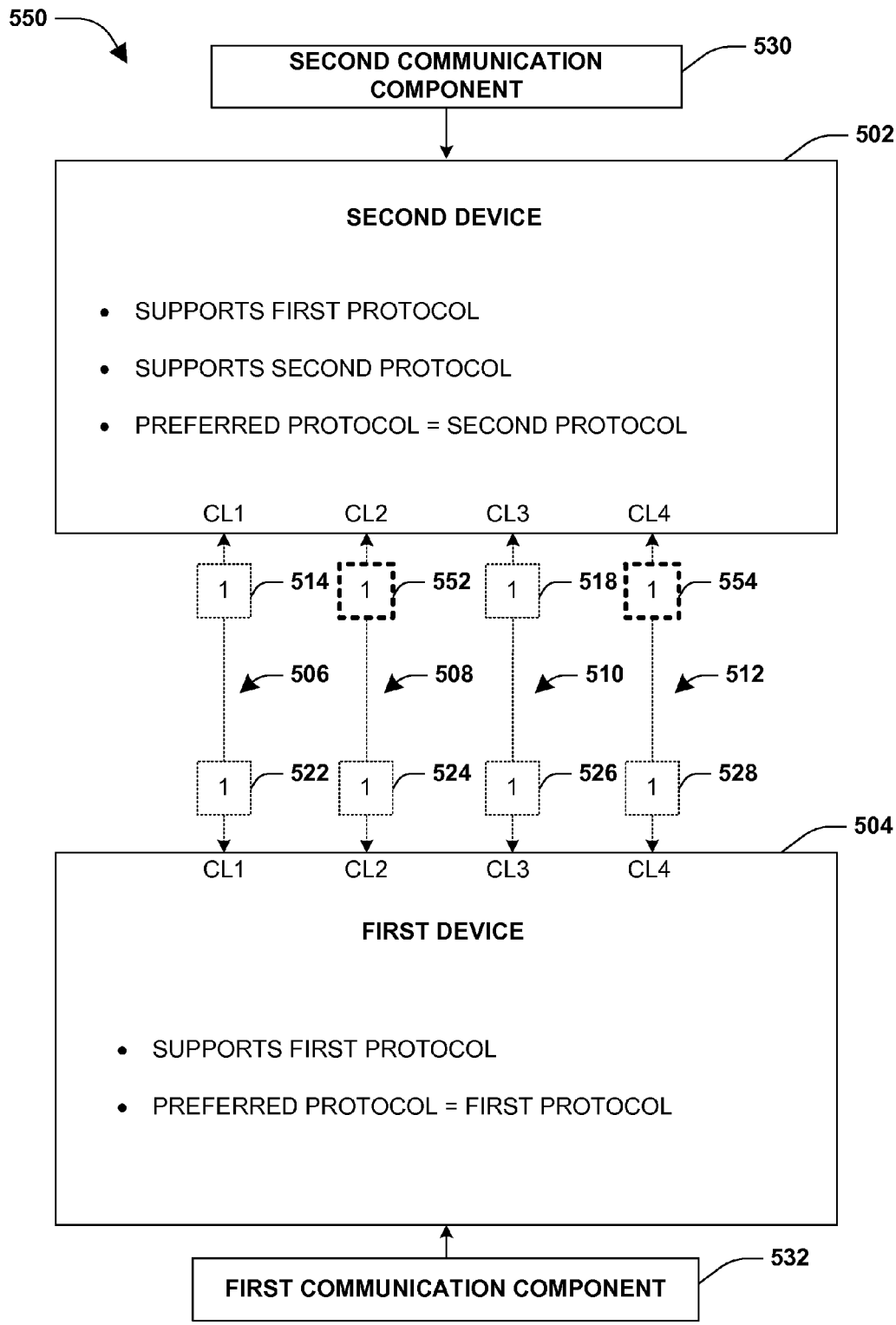
FIG. 5B is a component block diagram illustrating an exemplary system for dynamically selecting a protocol for communication between devices.

FIG. 5B illustrates an example of a system 550 for dynamically selecting a protocol for communication between devices. It may be appreciated that in one example, the system 550 corresponds to the system 500 of FIG. 5A. That is, the system 550 may comprise a first communication component 532 associated with a first device 504 and/or a second communication component 530 associated with a second device 502. The second communication component 530 may have determined that the first device 504 supports a first protocol, but does not support a second protocol. The first communication component 532 may have determined that the second device 504 supports the first protocol. Accordingly, the second communication component 530 may switch a seventh assignment 516, illustrated in FIG. 5A, from the second protocol to the first protocol, resulting in a modified seventh assignment 552. The second component 530 may switch an eighth assignment 520, illustrated in FIG. 5A, from the second protocol to the first protocol, resulting in a modified eighth assignment 554. In this way, the second device 502 and the first device 504 may dynamically select the first protocol for communication over the communication links.

FIG. 6A illustrates an example of a system 600 for dynamically selecting a protocol for communication between devices. The system 600 may comprise a first communication component 632 associated with a first device 604 and/or a second communication component 630 associated with a second device 602. The first communication component 632 and/or the second communication component 630 may be configured to attempt one or more protocols over communication links between the first device 604 and the second device 602. For example, a first communication link 606, a second communication link 608, a third communication link 610, a fourth communication link 612, and/or other communication links not illustrated may connect the first device 604 and the second device 602 (e.g., the communication links may be associated with links along an optical cable between wide ports of the first device 604 and the second device 602).

The first device 604 may support a first protocol and a second protocol. The second protocol may be a preferred protocol for the first device 604. Accordingly, the first communication component 632 may assign the first protocol to the first communication link 606 as a first assignment 622 and to the third communication link 610 as a second assignment 626 (e.g., based upon the protocol to link map 302). The first communication component 632 may assign the second protocol to the second communication link 608 as a third assignment 624 and to the fourth communication link 612 as a fourth assignment 628 (e.g., based upon the protocol to link map 302). The second device 602 may support the first protocol and the second protocol. The second protocol may be a preferred protocol for the second device 602. Accordingly, the second communication component 630 may assign the first protocol to the first communication link 606 as a fifth assignment 614 and to the third communication link 610 as a sixth assignment 618 (e.g., based upon the protocol to link map 302). The second communication component 630 may assign the second protocol to the second communication link 608 as a seventh assignment 616 and to the fourth communication link 612 as an eighth assignment 620 (e.g., based upon the protocol to link map 302).

The first communication component 632 may initialize the communication links utilizing the assigned protocols for the first device 604, and the second communication component 630 may initialize the communication links utilizing the assigned protocols for the second device 602. In an example, the second communication component 630 may determine that the first communication link 606, using the first protocol, and the third communication link 610, using the first protocol, may be active, and thus the second communication component 630 may determine that the first device 604 supports the first protocol. The second communication component 630 may determine that the second communication link 608, using the second protocol, and the fourth communication link 612, using the second protocol, may be active, and thus the second communication component 630 may determine that the first device 604 may support the second protocol. Similarly, the first communication component 632 may determine that the second device 602 supports the first protocol and the second protocol based upon the active communication links. The second communication component 630 may determine that the second protocol is a preferred protocol over the first protocol for the second device 602 and/or the first communication component 632 may determine that the second protocol is a preferred protocol over the first protocol for the first device 604. In this way, the second device 602 and the first device 604 may communicate over the communication links utilizing the second protocol because the second protocol is a preferred protocol supported by the first device 604 and the second device 602, as illustrated in FIG. 6B.

Figure 6B:
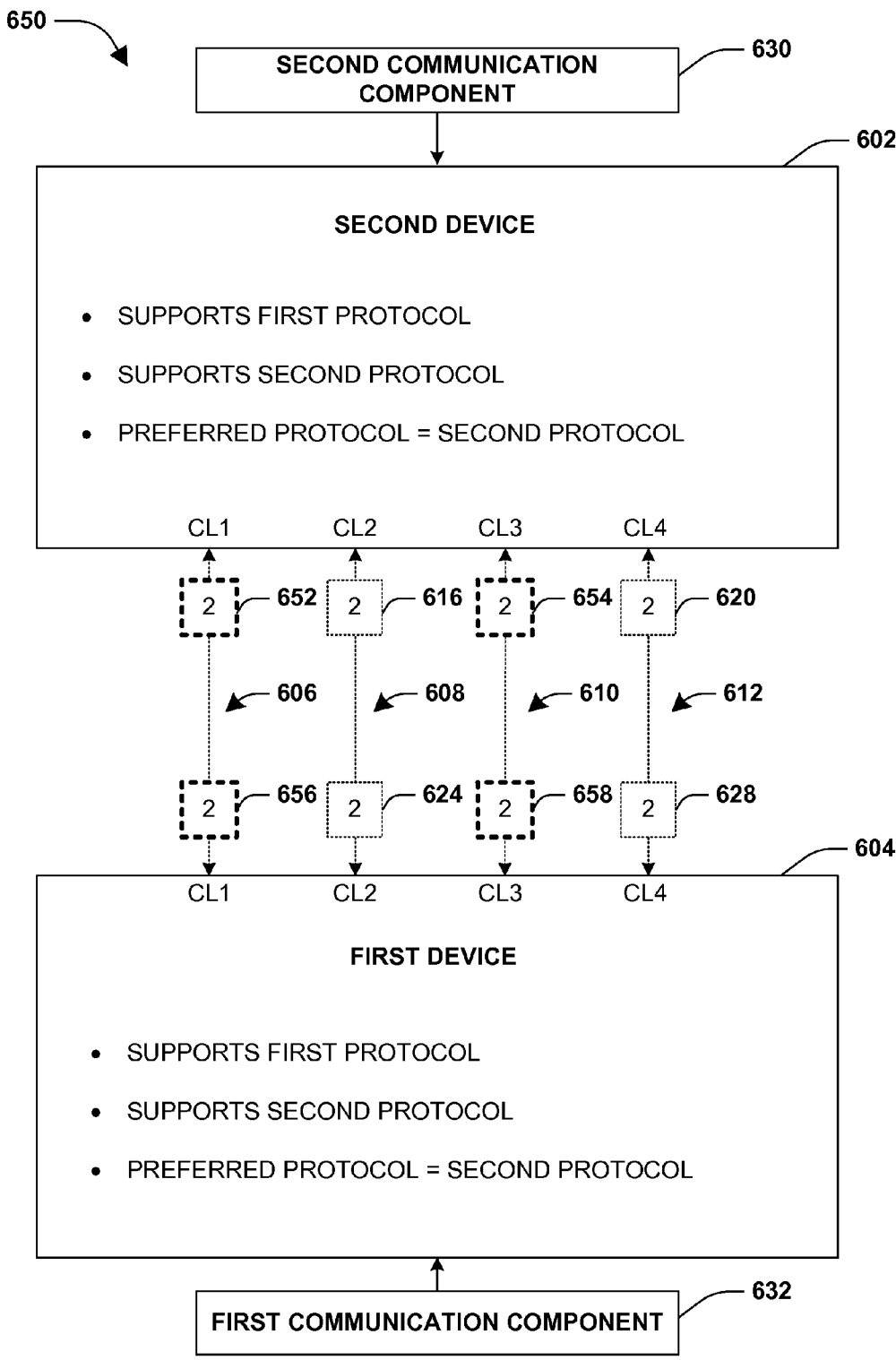
FIG. 6B is a component block diagram illustrating an exemplary system for dynamically selecting a protocol, preferred over another supported protocol, for communication between devices.

FIG. 6B illustrates an example of a system 650 for dynamically selecting a protocol for communication between devices. It may be appreciated that in one example, the system 650 corresponds to the system 600 of FIG. 6A. That is, the system 650 may comprise a first communication component 632 associated with a first device 604 and/or a second communication component 630 associated with a second device 602. The second communication component 630 may have determined that the first device 604 supports a first protocol and a second protocol. The first communication component 632 may have determined that the second device 602 supports the first protocol and the second protocol. Because the second protocol is preferred over the first protocol by the first device 604 and by the second device 602, the first communication component 632 and the second communication component 630 may utilize the second protocol over the communication links. For example, the second communication component 630 may switch a fifth assignment 614, illustrated in FIG. 6A, from the first protocol to the second protocol, resulting in a modified fifth assignment 652. The second communication component 630 may switch a sixth assignment 618, illustrated in FIG. 6A, from the first protocol to the second protocol, resulting in a modified sixth assignment 654. The first communication component 632 may switch a first assignment 622, illustrated in FIG. 6A, from the first protocol to the second protocol, resulting in a modified first assignment 656. The first communication component 632 may switch a second assignment 626, illustrated in FIG. 6A, from the first protocol to the second protocol, resulting in a modified second assignment 658. In this way, the second device 602 and the first device 604 may dynamically select the second protocol, being a preferred protocol and supported by both the first device 604 and the second device 602, for communication over the communication links.

FIG. 7A illustrates an example of a system 700 for dynamically selecting a protocol for communication between devices. The system 700 may comprise a first communication component 732 associated with a first device 704 and/or a second communication component 730 associated with a second device 702. The first communication component 732 and/or the second communication component 730 may be configured to attempt one or more protocols over communication links between the first device 704 and the second device 702. For example, a first communication link 706, a second communication link 708, a third communication link 710, a fourth communication link 712, and/or other communication links not illustrated may connect the first device 704 and the second device 702 (e.g., the communication links may be associated with links along an optical cable between wide ports of the first device 704 and the second device 702).

The first device 704 may support a first protocol, a third protocol, and a fourth protocol. The fourth protocol may be a preferred protocol and the third protocol may be a next preferred protocol for the first device 704. Accordingly, the first communication component 732 may assign the first protocol to the first communication link 706 as a first assignment 722 and to the second communication link 708 as a second assignment 724. The first communication component 732 may assign the third protocol to the third communication link 710 as a third assignment 726. The first communication component 732 may assign the fourth protocol to the fourth communication link 712 as a fourth assignment 728. The second device 702 may support the first protocol, a second protocol, and the third protocol. Accordingly, the second communication component 730 may assign the first protocol to the first communication link 706 as a fifth assignment 714. The second communication component 730 may assign the second protocol to the second communication link 708 as a sixth assignment 716. The second communication component 730 may assign the third protocol to the third communication link 710 as a seventh assignment 718 and to the fourth communication link 712 as an eighth assignment 720.

The first communication component 732 may initialize the communication links utilizing the assigned protocols for the first device 704, and the second communication component 730 may initialize the communication links utilizing the assigned protocols for the second device 702. In an example, the second communication component 730 may determine that the first communication link 706, using the first protocol, may be active, and thus the second communication component 730 may determine that the first device 704 supports the first protocol. The second communication component 730 may determine that the second communication link 708, using the second protocol, may be inactive, and thus the second communication component 730 may determine that the first device 704 may not support the second protocol. The second communication component 730 may determine that the third communication link 710, using the third protocol, may be active, and thus the second communication component 730 may determine that the first device 704 may support the third protocol (e.g., regardless of the fourth communication link 712, using the third protocol, being inactive because the first device 704 may be attempting a different protocol on the fourth communication link 712 such as the fourth protocol based upon the fourth assignment 728).

In another example, the first communication component 732 may determine that the first communication link 706, using the first protocol, may be active, and thus the first communication component 732 may determine that the second device 702 supports the first protocol (e.g., regardless of the second communication link 708, using the first protocol, being inactive because the second device 702 may be attempting a different protocol on the second communication link 708 such as the second protocol based upon the sixth assignment 716). The first communication component 732 may determine that the third communication link 710, using the third protocol, may be active, and thus the first communication component 732 may determine that the second device 702 supports the third protocol. The first communication component 732 may determine that the fourth communication link 712, using the fourth protocol, may be inactive, and thus the first communication component 732 may determine that the second device 702 does not support the fourth protocol.

In this way, the first device 704 and the second device 702 may determine that both devices support the first protocol and the third protocol. Accordingly, the third protocol may be determined as being preferred over the first protocol (e.g., the second device 702 may prefer the third protocol and/or the first device 704 may prefer the third protocol over the first protocol). In this way, the second device 702 and the first device 704 may communicate over the communication links utilizing the third protocol because the third protocol is a preferred protocol over the first protocol, as illustrated in FIG. 7B.

Figure 7B:
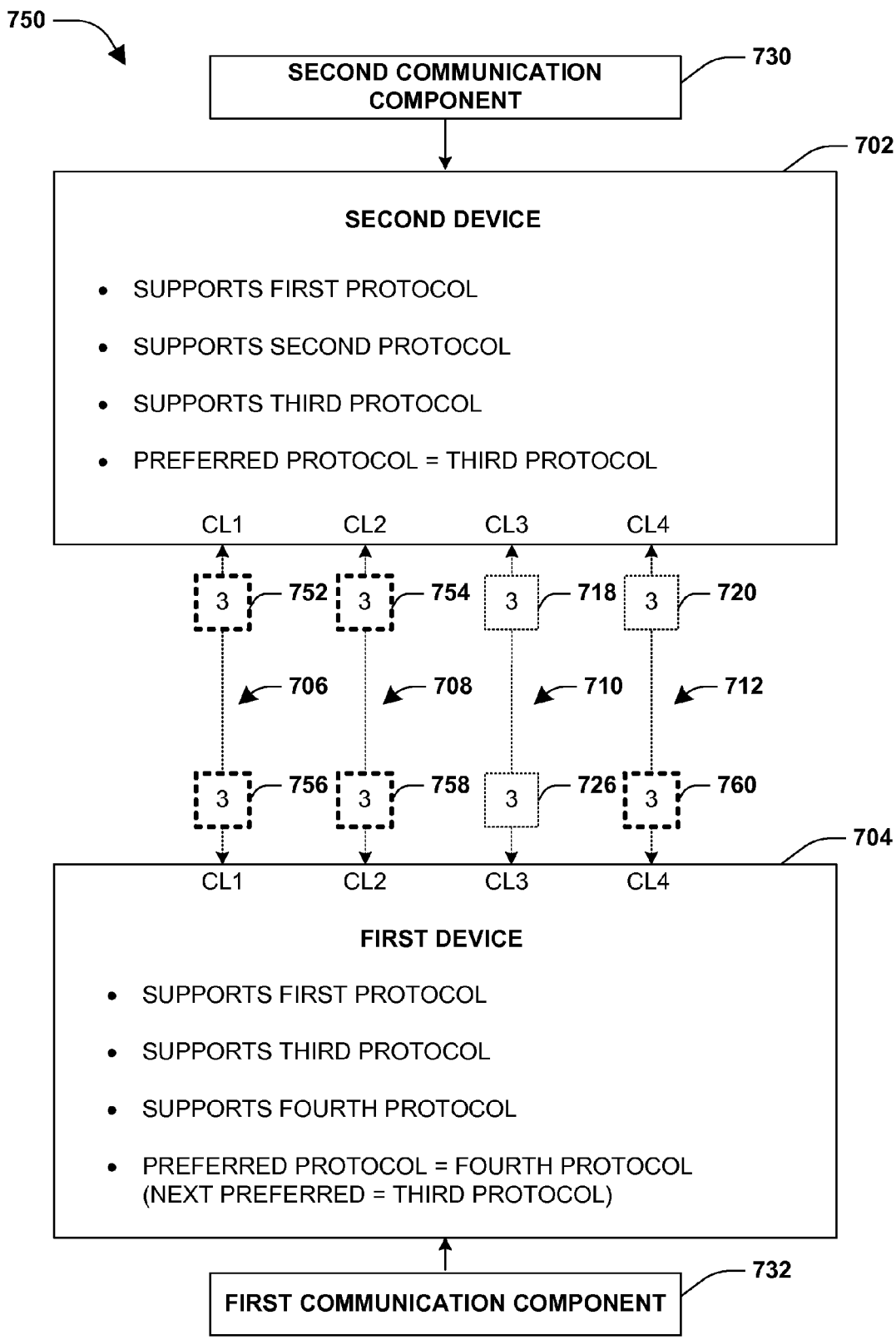
FIG. 7B is a component block diagram illustrating an exemplary system for dynamically selecting a protocol, preferred over another supported protocol, for communication between devices.

FIG. 7B illustrates an example of a system 750 for dynamically selecting a protocol for communication between devices. It may be appreciated that in one example, the system 750 corresponds to the system 700 of FIG. 7A. That is, the system 750 may comprise a first communication component 732 associated with a first device 704 and/or a second communication component 730 associated with a second device 702. The second communication component 730 may have determined that the first device 704 supports a first protocol and a third protocol. The first communication component 732 may have determined that the second device 702 supports the first protocol and the third protocol. Because the third protocol is preferred over the first protocol by the first device 704 and the second device 702, the first communication component 732 and the second communication component 730 may utilize the third protocol over the communication links. For example, the second communication component 730 may switch a fifth assignment 714, illustrated in FIG. 7A, from the first protocol to the third protocol, resulting in a modified fifth assignment 752. The second communication component 730 may switch a sixth assignment 716, illustrated in FIG. 7A, from a second protocol to the third protocol, resulting in a modified sixth assignment 754. The first communication component 732 may switch a first assignment 722, illustrated in FIG. 7A, from the first protocol to the third protocol, resulting in a modified first assignment 756. The first communication component 732 may switch a second assignment 724, illustrated in FIG. 7A, from the first protocol to the third protocol, resulting in a modified second assignment 758. The first communication component 732 may switch a fourth assignment 728, illustrated in FIG. 7A, from a fourth protocol to the third protocol, resulting in a modified fourth assignment 760. In this way, the second device 702 and the first device 704 may dynamically select the third protocol, being a preferred protocol over other protocols supported by both the first device 704 and the second device 702, for communication over the communication links.

Figure 8:
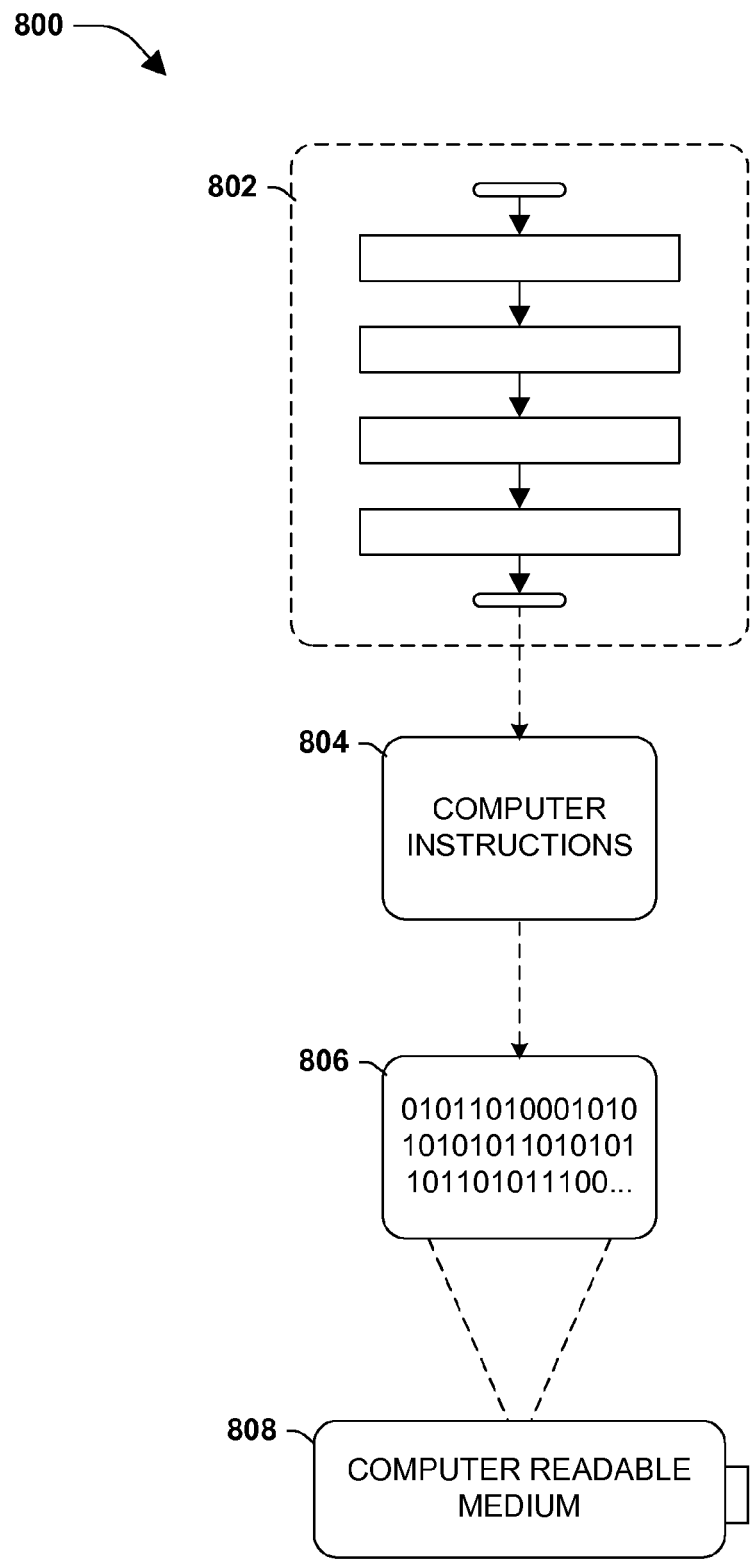
FIG. 8 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 400 of FIG. 4, for example. In some embodiments, the processor-executable instructions 804 are configured to implement a system, such as at least some of the exemplary system 500 of FIG. 5A, at least some of the exemplary system 550 of FIG. 5B, at least some of the exemplary system 600 of FIG. 6A, at least some of the exemplary system 650 of FIG. 6B, at least some of the exemplary system 700 of FIG. 7A, and/or at least some of the exemplary system 750 of FIG. 7B, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

assigning, by a computing device, a first protocol supported by the computing device to a first communication link between the computing device and a requesting one of a plurality of computing devices and a second protocol supported by the computing device to a second communication link between the computing device and the requesting one of the plurality of computing devices based on a pre-defined protocol to communication link map providing a protocol to communication link mapping unrelated to the requesting one of the plurality of computing devices;

initializing, by the computing device, the first communication link and the second communication link by sending data to the requesting one of the plurality of computing devices based on the first protocol and the second protocol;

determining, by the computing device, a speed of the data sent to the requesting one of the plurality of computing devices over the first communication link and the second communication link; and assigning, by the computing device, the second protocol to the first communication link when the determined speed of the data sent over the second communication link exceeds the determined speed of the data sent over the first communication link, or the first protocol to the second communication link when the determined speed of the data sent over the first communication link exceeds the determined speed of the data sent over the second communication link.

2. The method of claim 1, further comprising:

determining, by the computing device, when the requesting one of the plurality of computing devices supports the first protocol and when the requesting one of the plurality of computing devices supports the second protocol;

switching, by the computing device, the assignment of the first communication link to the second protocol when the requesting one of the plurality of computing devices does not support the first protocol; and switching, by the computing device, the assignment of the second communication link to the first protocol when the requesting one of the plurality of computing devices does not support the second protocol.

3. The method of claim 1, further comprising:

determining, by the computing device, a security level of the first protocol and the second protocol; and switching, by the computing device, the assignment of the first protocol or the second protocol based on the determined security level of the first protocol.

4. The method of claim 1, wherein the first protocol or the second protocol comprises a Serial Attached Small computer system interface (SAS) 2.0 protocol or a SAS 3.0 protocol.

5. A computing device comprising:

a memory containing a machine readable medium comprising machine executable code having stored thereon instructions for performing a method of dynamic protocol selection;

a processor coupled to the memory, the processor configured to execute the machine executable code to cause the processor to:

assign a first protocol supported by the computing device to a first communication link between the computing device and a requesting one of a plurality of computing devices and a second protocol supported by the computing device to a second communication link between the computing device and the requesting one of the plurality of computing devices based on a pre-defined protocol to communication link map providing a protocol to communication link mapping unrelated to the requesting one of the plurality of computing devices;

initialize the first communication link and the second communication link by sending data to the requesting one of the plurality of computing devices based on the first protocol and the second protocol; and determine a speed of the data sent to the requesting one of the plurality of computing devices over the first communication link and the second communication link; and assign the second protocol to the first communication link when the speed of the data sent over the second communication link exceeds the speed of the data sent over the first communication link, or the first protocol to the second communication link when the determined speed of the data sent over the first communication link exceeds the determined speed of the data sent over the second communication link.

6. A non-transitory computer readable medium having stored thereon instructions for performing a method comprising machine executable code which when executed by at least one machine, causes the machine to:

assign a first protocol supported by the machine to a first communication link between the machine and a requesting one of a plurality of computing devices and a second protocol supported by the machine to a second communication link between the machine and the requesting one of the plurality of computing devices based on a pre-defined protocol to communication link map providing a protocol to communication link mapping unrelated to the requesting one of the plurality of computing devices;

initialize the first communication link and the second communication link by sending data to the requesting one of the plurality of computing devices based on the first protocol and the second protocol;

determine a speed of the data sent to the requesting one of the plurality of computing devices over the first communication link and the second communication link; and assign the second protocol to the first communication link when the determined speed of the data sent over the second communication link exceeds the determined speed of the data sent over the first communication link, or the first protocol to the second communication link when the determined speed of the data sent over the first communication link exceeds the determined speed of the data sent over the second communication link.

7. The medium of claim 6, further having stored thereon instructions that when executed by the machine, cause the machine to perform steps further comprising:

determining when the requesting one of the plurality of computing devices supports the first protocol and when the requesting one of the plurality of computing devices supports the second protocol;

switching the assignment of the first communication link to the second protocol when the requesting one of the plurality of computing devices does not support the first protocol; and switching the assignment of the second communication link to the first protocol when the requesting one of the plurality of computing devices does not support the second protocol.

8. The medium of claim 6, further having stored thereon instructions that when executed by the machine, cause the machine to perform steps further comprising:

determining a security level of the first protocol and the second protocol; and switching the assignment of the first protocol or the second protocol based on the determined security level of the first protocol.

9. The medium of claim 6, wherein the first protocol or the second protocol comprises a Serial Attached Small computer system interface (SAS) 2.0 protocol or a SAS 3.0 protocol.

10. The computing device of claim 5, wherein the processor is further configured to execute the machine executable code, which comprises the executable code stored in the memory to:

determine when the requesting one of the plurality of computing devices supports the first protocol and when the requesting one of the plurality of computing devices supports the second protocol;

switch the assignment of the first communication link to the second protocol when the requesting one of the plurality of computing devices does not support the first protocol; and switch the assignment of the second communication link to the first protocol when the requesting one of the plurality of computing devices does not support the second protocol.

11. The computing device of claim 5, wherein the processor is further configured to execute the machine executable code, which comprises the executable code stored in the memory to:

determine a security level of the first protocol and the second protocol; and switch the assignment of the first protocol or the second protocol based on the determined security level of the first protocol.

12. The computing device of claim 5, wherein the first protocol or the second protocol comprises a Serial Attached Small computer system interface (SAS) 2.0 protocol or a SAS 3.0 protocol.

* * * * *